Patented Apr. 25, 1933

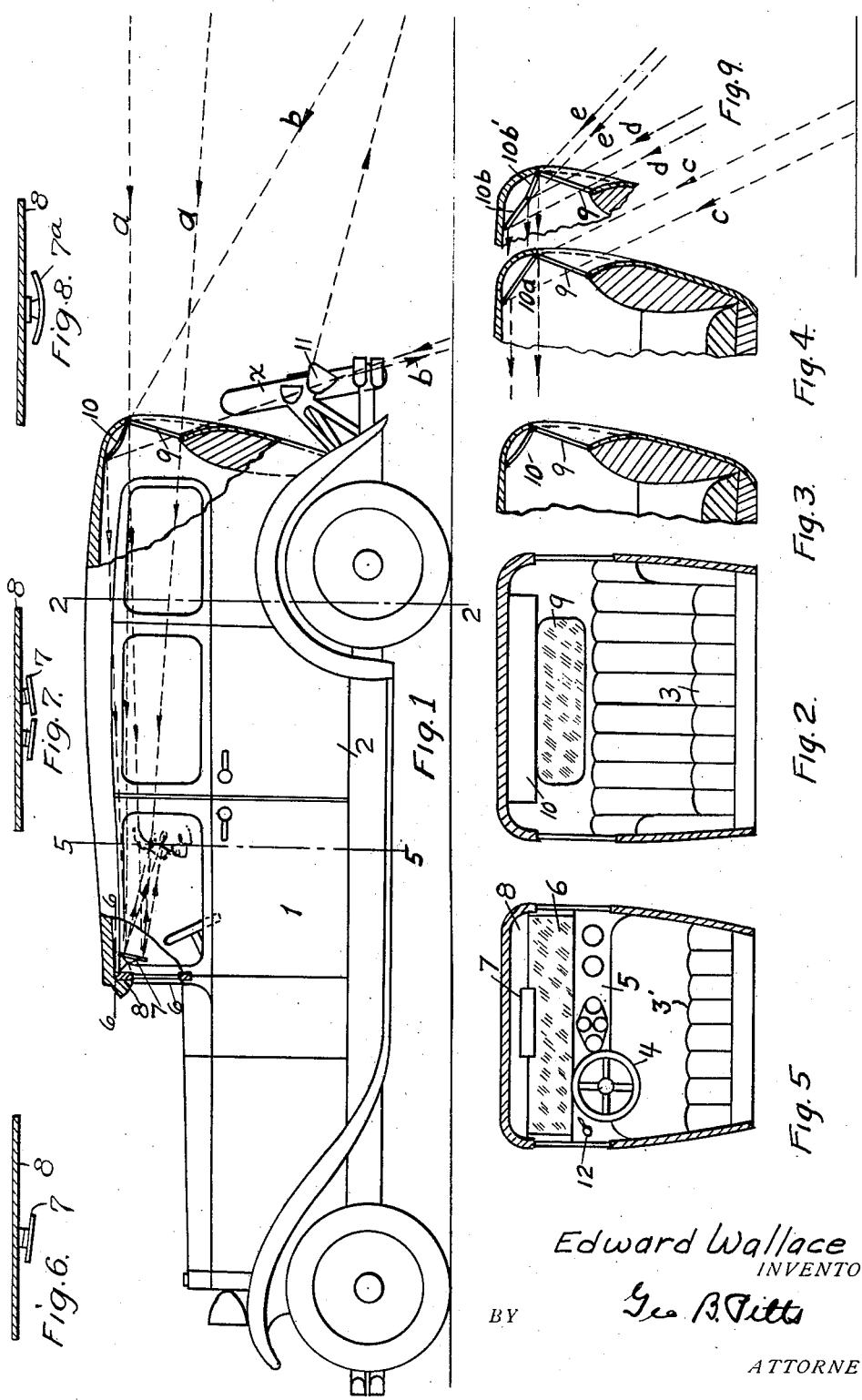

1,905,323

UNITED STATES PATENT OFFICE

EDWARD WALLACE, OF CLEVELAND HEIGHTS, OHIO

ATTACHMENT FOR VEHICLES

Application filed April 27, 1931. Serial No. 533,174.

The invention relates to a safety attachment for automotive vehicles, and has particular reference to light reflectors, which enables the driver of the vehicle as well as others seated with the driver to observe the road or area and objects rearward of the vehicle. Such vision or observance is peculiarly advantageous in driving the car backwardly, as out of a drive-way, or into and out of a parking space, especially where shifting forwardly and rearwardly is required. The attachment therefore serves to prevent accidents to life and property while operating the vehicle as above set forth. The invention is also advantageously used in driving in traffic, as it enables the driver to see exactly how close a vehicle at his rear is and to judge more accurately its speed, so that he may increase his speed to avoid collision. One object of the invention is therefore to provide an improved attachment which facilitates operation of a vehicle and which enables such operation with danger of accident materially reduced.

Another object of the invention is to provide within a vehicle a pair of light reflectors so arranged that the area or space immediately behind the vehicle may be observed by the driver or a person sitting at the forward portion of the car, without turning his head.

Another object of the invention is to provide a safety attachment for a vehicle so arranged that by a slight movement of the head or eyes, the driver may see through the rear window of the car to (a) observe in the rear the road and objects which are more or less remote from his car or (b) the immediate area behind him.

Another object of the invention is provided within a vehicle related reflectors so constructed and arranged that a relatively large area may be observed by vehicle driver.

Another object of the invention is to provide a vehicle with improved means for observing the area rearward of the car, at night as well as during daylight.

Other objects of the invention will be apparent to those skilled in the art to which my invention relates from the following description taken in connection with the accompanying drawing, wherein Fig. 1 is a side elevation of a vehicle embodying my invention, parts being broken away.

Fig. 2 is a cross section on the line 2—2 of Fig. 1, looking towards the rear.

Fig. 3 is a fragmentary section showing a modified construction.

Fig. 4 is a view similar to Fig. 3 showing a flat reflector in the place of the curved one.

Fig. 5 is a section on the line 5—5 of Fig. 1.

Fig. 6 is a fragmentary section on the line 6—6 of Fig. 1.

Fig. 7 is a section similar to Fig. 6, but showing two flat reflectors.

Fig. 8 is a view similar to Fig. 6, but showing a curved reflector.

Fig. 9 is a fragmentary section showing a different embodiment of the invention.

In the drawing, 1 indicates an automotive vehicle. I have, for illustrative purposes, shown a vehicle of the passenger type having a sedan body 2, but the invention is applicable to other types of bodies, as well as busses, trucks and other vehicles. The body 2 is provided with a rear seat 3, a front seat 3' for the driver and other passengers, steering wheel 4, instrument board 5 and windshield 6.

7 indicates a reflector mounted above the front window or windshield, such as on the frame 8 in the form of construction shown. The reflector 7 is adjustable and reflects light through the rear window 9, whereby the driver (whose face is diagrammatically shown) may make observations therethrough, as indicated by the lines a—a, and see the road and objects at a more or less remote point to the rear. 10 indicates a supplemental reflector within the vehicle and above the window 9. The reflector 10 is so related to the reflector 7 and window 9 that light is reflected through the latter, as indicated by the lines b—b, whereby the area and/or objects immediately behind the vehicle may be observed by the driver.

In Fig. 1, I have shown the reflector 10 as of convexed shape (longitudinally of the vehicle); it may also be curved transversely.

When of the shape shown in Fig. 1, it collects light substantially between the lines b—b, which light is reflected to the reflector 7 and by the latter to the eye of the driver. Where the reflector 10 is a plane, as shown at 10a in Fig. 4, it collects light substantially between the lines c—c.

When desired, the reflector 7 may be of the convexed type as shown at 7a in Fig. 8.

Where it is desired to use a plane reflector, I may provide a combination of such reflectors, as shown at 10b, 10b', Fig. 9, the former serving to permit visibility of the area between the lines d—d immediately behind the vehicle and the latter serving to permit visibility of the area more or less remote from the vehicle between the lines e—e. When desired, the reflectors 10b, 10b', may be formed integrally and bent to the desired angular relation.

It will be noted that the reflector 10 is so combined and related to the window 9 and reflector 7 that the driver may make observations through the window by the rays reflected directly therefrom by reflector 7 or indirectly by the rays reflected from the window to the reflector 10 and then to the reflector 7, by adjustment of his head or eyes; however, by proper adjustment of the reflector 7, the driver may make both observations simultaneously.

The reflector 10 may be mounted in a suitable frame and the latter secured within the vehicle in any desired manner. In the preferred form of construction, the frame is incorporated in the body structure to insure a permanent mounting and also to provide for consistency in appearance, beauty and finish in accordance with the interior finish of the car.

It is also preferable, in mounting the reflector 10 in the vehicle to arrange the lower or rear edge of the reflector surface in edge to edge engagement with the upper edge of the window (or with such edges as close together as is practical).

When it is desired to observe the area immediately adjacent the rear of the vehicle or equipment carried at the rear thereof, as indicated at x (Fig. 1), the rear window 9 is mounted in a rearwardly inclined direction and to insure the desired angle of inclination the rear wall of the vehicle body may be inclined rearwardly, as shown in Fig. 1. In this arrangement the rear seat back or body wall below the window 9 will not obstruct the light rays leading to the reflector 10. This arrangement also insures mounting of the reflector rearward of a passenger seated in the back seat.

When desired, the reflector 10 may be movably mounted to permit of its adjustment to different angular positions. This adjustment is more particularly desirable with respect to the form of construction shown in Fig. 9. Such adjustment permits the driver to observe areas at any desired distances at the rear according to his wishes.

In the preferred construction, I use a convexed reflector as shown in Fig. 1, as such form collects light from a relatively large area, as shown by the lines b—b, which is of great advantage to the driver.

11 indicates an auxiliary lamp suitably mounted at the rear of the vehicle and adapted to throw light on the area, or a portion thereof, reflected by or observable through the reflector 10, whereby observations may be made at night. The lamp 11 is controlled by a switch 12, preferably mounted on the instrument board 5.

The reflector 10 may be made of any desired width.

The reflectors 7 and 10 are preferably glass mirrors.

Where two plane reflectors 7 are provided, as shown in Fig. 7 or a convexed reflector 7a, as shown in Fig. 8, other persons beside the driver may make observations as above described.

When desired either or both reflectors 7, 10 may be made of non-shatterable glass. In this form of reflector, one face of the glass is coated with a suitable reflecting material, such as mercury, in the usual manner silvering ordinary glass.

To those skilled in the art to which my invention relates, many changes in construction and widely differing embodiments and applications of the invention will suggest themselves without departing from the spirit and scope thereof. The disclosures herein and the description are purely illustrative and are not intended to be in any sense limiting.

What I claim is:

1. In a vehicle, the combination with a wheel mounted body having a rear window, a top and a driver's seat, of a rear view reflector mounted in front of and in reflecting relation to the eye of a person seated in the driver's seat, and a ground view reflector mounted within said body above said rear window and adjacent thereto, said ground view reflector being curved on lines extending transversely of said body and arranged to reflect converging light rays passing through said window to said rear view reflector for reflection to the eye of a person seated in said seat.

2. In a vehicle, the combination with a wheel mounted body having a rear window, a top and a driver's seat, of a rear view reflector mounted in front of and in reflecting relation to the eye of a person seated in the driver's seat, and a ground view reflector mounted within said body above said rear window and adjacent thereto, said ground view reflector being curved on lines extending transversely of said body and arranged to reflect converging light rays passing through said window to said rear view reflector for reflection to the eye of a person seated in said seat, said ground view reflector having a length longitudinally of said body proportioned to the vertical height of said rear window to effect collection of maximum light rays passing through the latter.

3. In a vehicle, the combination with a wheel mounted body having a rear window, a top and a driver's seat, of a rear view reflector mounted in front of and in reflecting relation to the eye of a person seated in the driver's seat, and a ground view reflector mounted within said body above said rear window and adjacent thereto, said ground view reflector being curved on lines extending transversely of said body and arranged to reflect converging light rays passing through said window to said rear view reflector for reflection to the eye of a person seated in said seat, said ground view reflector having a length longitudinally of said body proportioned to the vertical height of said rear window to effect collection of maximum light rays passing through the latter, the rear edge of said ground view reflector being arranged in contiguous relation to the upper edge of said rear window.

4. In a vehicle, the combination with a wheel mounted body having a rear window, a top and a driver's seat, of a rear view reflector mounted in front of and in reflecting relation to the eye of a person seated in the driver's seat, and a ground view reflector mounted within said body above said rear window and adjacent thereto, said ground view reflector being curved on lines extending transversely of said body and arranged to reflect converging light rays passing through said window to said rear view reflector for reflection to the eye of a person seated in said seat, said ground reflector having a length longitudinally of said body proportioned to the vertical height of said rear window to effect collection of maximum light rays passing through the latter, and having a width equal to the width of said rear window transversely of said body, the rear edge of said ground view reflector being arranged in contiguous relation to the upper edge of said rear window.

5. In a vehicle, the combination with a wheel mounted body having a rear window, a top and a driver's seat in said body, of a rear view reflector mounted in front of and in reflecting relation to the eye of a person seated in said driver's seat, and a ground view reflector mounted within said body above said window and having its rear horizontal edge in substantially contiguous relation to the upper edge of said window and convexedly curved inwardly and upwardly relatively thereto to reflect converging light rays passing through said window to said rear view reflector for reflection to the eye of a person seated in said seat.

6. In a vehicle, the combination with a wheel mounted body having a rear window, a top and a driver's seat in said body, of a rear view reflector mounted in front of and in reflecting relation to the eye of a person seated in said driver's seat, and a ground view reflector mounted within said body above said window and having is rear horizontal edge in substantially contiguous relation to the upper edge of said window and convexedly curved inwardly and upwardly relatively thereto to reflect converging light rays passing through said window to said rear view reflector for reflection to the eye of a person seated in said seat, said ground view reflector having a length longitudinally of said body proportioned to the vertical height of said rear window to effect collection of maximum light rays passing through the latter.

7. In a vehicle, the combination with a wheel mounted body having a rear window, a top and a driver's seat in said body, of a rear view reflector mounted in front of and in reflecting relation to the eye of a person seated in said driver's seat, and a ground view reflector mounted within said body above said window and having its rear horizontal edge in substantially contiguous relation to the upper edge of said window and convexedly curved inwardly and upwardly relatively thereto to reflect converging light rays passing through said window to said rear view reflector for reflection to the eye of a person seated in said seat, said ground view reflector having a length longitudinally of said body proportioned to the vertical height of said rear window to effect collection of maximum light rays passing through the latter and having a width equal to the width of said window in a direction transversely of said body.

8. In a vehicle, the combination with a wheel mounted body having a rear window, a top and a driver's seat, of a rear view reflector mounted in front of and in reflecting relation to the eye of a person seated in said driver's seat, and a ground view reflector mounted within said body above said window, said ground view reflector having a width equal to the width of said window and extending in a curvilinear direction from the upper edge of said window upwardly to reflect converging light rays passing through said window to said rear view reflector for reflection to the eye of a person seated in said seat.

9. In a vehicle, the combination with a wheel mounted body having a rear window, a top and a driver's seat, of a rear view reflector mounted in front of and in reflecting relation to the eye of a person seated in the driver's seat, and a ground view reflector mounted within said body above said rear window and adjacent to its upper edge said ground view reflector having a curvilinear reflecting surface arranged to reflect converging light rays passing through said window to said rear view reflector for reflection to the eye of a person seated in said seat.

10. In a vehicle, the combination with a wheel mounted body having a rear window, a top and a driver's seat, of a ground view reflector mounted within said body and above said rear window, said ground view reflector being co-extensive in width to the width of said window and extending in a curvilinear direction longitudinally of said body from the upper edge of said window upwardly to reflect forwardly converging light rays passing through said window.

11. In a vehicle, the combination with a wheel mounted body having a rear window, a top and a driver's seat, of a ground view reflector mounted within said body and above said rear window and adjacent to its upper edge, said ground view reflector having a convex reflecting surface curved on transverse lines and arranged to reflect forwardly converging light rays passing through said window.

12. In a vehicle, the combination with a wheel mounted body having a rear window, a top and a driver's seat, of a ground view reflector mounted within said body and above said rear window, said ground view reflector being co-extensive in width to the width of said window and having a curvilinear reflecting surface extending in a longitudinal direction and proportioned to the vertical height of said rear window to collect the maximum number of light rays passing through said window.

In testimony whereof, I have hereunto affixed my signature.

EDWARD WALLACE.